United States Patent [19]

Newell

[11] 4,225,460
[45] Sep. 30, 1980

[54] LATENT LEWIS ACID CATALYST SYSTEM AND PROCESS

[75] Inventor: Richard G. Newell, Woodbury, Minn.

[73] Assignee: Minnesota Mining and Manufacturing Company, St. Paul, Minn.

[21] Appl. No.: 53,056

[22] Filed: Jun. 28, 1979

[51] Int. Cl.³ .......................... B01J 3/02; B32B 5/16; C08G 18/28
[52] U.S. Cl. ................. 252/429 R; 428/407; 526/122; 526/233; 526/237; 528/48; 528/73; 528/89; 528/91; 528/92; 528/368
[58] Field of Search ...................... 252/429 R; 528/73; 428/407

[56] References Cited

U.S. PATENT DOCUMENTS

| 3,018,258 | 1/1962 | Meier | 260/6 |
| 3,384,680 | 5/1968 | Lussow | 260/830 |
| 3,860,565 | 1/1975 | Barber | 260/77.5 NC |

FOREIGN PATENT DOCUMENTS 1103202  2/1968  United Kingdom.
1158662  7/1969  United Kingdom.

*Primary Examiner*—John F. Niebling
*Attorney, Agent, or Firm*—Cruzan Alexander; Donald M. Sell; Donald C. Gipple

[57] ABSTRACT

Microcapsules with liquid fills containing Lewis acid catalysts, catalyst concentrates comprising slurries of the microcapsules in liquid media and a method for preparing the microcapsules and concentrates.

28 Claims, No Drawings

LATENT LEWIS ACID CATALYST SYSTEM AND PROCESS

BACKGROUND OF THE INVENTION

The present invention relates to a latent Lewis acid catalyst suitable for use in a storage-stable, one-part, curable resin system.

Storage-stable, one-part, curable resin systems generally comprise two or more reactive or reaction-producing components stored in an intimately admixed, unreactive state which, ideally, react rapidly when subjected to a suitable stimulus, such as application of heat or mechanical shear. Such systems, combining a cationically curable resin and a latent Lewis acid catalyst, would be of considerable value (since two-part systems of these constituents cure rapidly to form strong bonds and have other properties which are valuable in particular uses, e.g. in some cases curing without the release of volatiles). Various attempts have indeed been made to prepare one-part systems from these and similar constituents, for example by adsorbing the catalyst into a carrier, by encapsulating or otherwise shielding it from the curable resins until released by the action of heat or pressure, etc. However these attempts (of which British Pat. No. 1,103,202, British Pat. No. 1,158,662 and U.S. Pat. No. 3,018,258 are illustrative) have met with only limited success due largely to difficulties in combining suitable stability prior to activation, speed of reaction after activation and overall adhesive properties.

THE PRESENT INVENTION

The present invention relates to latent Lewis acid catalysts for cationically polymerizable resin systems comprising microcapsules of a Lewis acid-polyhydric alcohol (preferably glycerol) complex encapsulated within shell walls of a crosslinked interfacial polycondensation product of an aromatic polyisocyanate, glycerol and a cycloaliphatic epoxide. Additional aspects of the invention include a process for the preparation of the microcapsules and latent Lewis acid concentrates comprised of the microcapsules dispersed in a liquid medium.

The catalysts are suitable for incorporation in cationically curable resins to form one-part, curable systems which have excellent long-term stability and which can be conveniently activated in various ways, including by means of mechanical shear, by heat and by solvent action. The speed and manner of cure can be controlled by the design of the system.

The microcapsules are easily and efficiently prepared and are usually added to the cationically curable resin as a concentrate in the encapsulation medium itself. This eliminates the separation step and effects further economy.

The microencapsulation process involves the formation of a shell wall utilizing the interfacial polycondensation products of a cycloaliphatic epoxy, glycerol and an aromatic polyisocyanate on the surface of a droplet of catalyst in either a potentially reactive or non-reactive microencapsulation medium (as those terms are explained hereinafter). More specifically it comprises
(a) dispersing and maintaining discrete droplets of a Lewis acid-polyhydric alcohol (glycerol) complex in a liquid medium selected from aromatic polyisocyanates having an equivalent weight of up to about 380 and a functionality of from about 2 to 6 and esters of an aromatic carboxylic acid and an alkyl, aralkyl or aryl alcohol, the ester containing up to about 40 carbon atoms, and
(b) adding to said liquid medium a composition comprising an aromatic polyisocyanate as defined above and a cycloaliphatic polyepoxide having an equivalent weight of from about 70 to 220 and a functionality of from about 2 to 3.

Interfacial polycondensation occurs at the droplet surfaces to form a slurry of rupturable microcapsules having shell walls of a crosslinked interfacial polyurethane-polyether reaction product of the aromatic polyisocyanate, glycerol and the cycloaliphatic polyepoxide and liquid fills comprising the Lewis acid-alcohol complex.

A stabilizer in the form of a scavenger for any catalyst remaining unencapsulated is normally then added or can be added later, e.g. before the capsule concentration is mixed with the curable resin.

The concentrates of the invention can be defined as slurries of

A. rupturable, impermeable microcapsules ranging in size from about 0.1 to 400 microns having
  (1) shell walls of a crosslinked interfacial polyurethane-polyether reaction product of an aromatic polyisocyanate having an equivalent weight of up to about 380 and a functionality of from about 2 to 6, glycerol and a cycloaliphatic polyepoxide having an equivalent weight of from about 70 to 220 and a functionality of from about 2 to 3, and
  (2) liquid fills comprising a Lewis acid-glycerol complex in B. a liquid medium selected from aromatic polyisocyanates as defined above and esters of an aromatic carboxylic acid and an alkyl, aralkyl or aryl alcohol, the ester containing up to about 40 carbon atoms.

The concentrates normally (and preferably) contain from about 1 to 50 parts (by weight) of A, the microcapsules, and 50 to 99 parts of B, the liquid medium, and sum of A and B being 100 parts. A more preferred class are those concentrates which contain from about 10 to 40 parts of the microcapsules and 60 to 90 parts of the liquid medium (the sum of the two being 100 parts).

The microcapsules themselves can, if desired, be separated from the liquid medium and, as previously noted, constitute an additional aspect of the invention. They can be mixed into a different liquid medium prior to use or, if desired, they can be mixed directly into a resin system to be catalyzed or into a component thereof. They can be described as rupturable, impermeable microcapsules ranging in size from about 0.1 to 400 microns having
  (1) shell walls of a crosslinked interfacial polyurethane-polyether reaction product of an aromatic polyisocyanate having an equivalent weight of up to about 380 and a functionality of from about 2 to 6, glycerol and a cycloaliphatic polyepoxide having an equivalent weight of from about 70 to 220 and a functionality of from about 2 to 3, and
  (2) liquid fills comprising a Lewis acid-glycerol complex.

The microcapsules are preferably reaction products of
  (a) 5–25 parts of the Lewis acid,
  (b) 5–30 parts of the aromatic polyisocyanate,
  (c) 5–20 parts of the cycloaliphatic polyepoxide and
  (d) 25–75 parts of glycerol,
the sum of (a), (b), (c) and (d) being 100 parts and the catalyst concentrates containing such capsules also constitute a preferred class.

Catalysts suitable for use in the microcapsules of the present invention are well known to the art and include Lewis acids and Lewis acid-derived Brönsted acids, for example $BF_3$, $SnCl_4$, $SbCl_5$, $SbF_5$, $PF_5$, $HBF_4$, $HPF_6$ and $HSbF_6$. These compounds are all referred to herein, for convenience, as Lewis acids. They are complexed with the polyhydric alcohol in order to form a liquid catalyst material which can be readily handled and effectively utilized in the microencapsulation process (the term complex, when used herein, includes any chemical reaction products which may be present). This liquid is insoluble in the medium under the conditions of encapsulation (i.e. will form droplets when dispersed therein).

The preferred polyhydric alcohol, glycerol, is hydroscopic and, as used, normally contains a minor amount of water, e.g. 0.1–5 percent, although it can contain up to 50 percent of water. The amounts of the polyhydric alcohol (glycerol) as given herein include this water. An excess of the glycerol is ordinarily used (over that required to complex with the Lewis acid), and some of the free hydroxyl groups at the surface of the droplets is believed to react with the shell wall components during encapsulation and thereby participate in the formation of the shell walls. When released from the capsules dispersed in a cationically-curable resin, the glycerol will mix with the resin and participate in its polymerization.

The liquid medium in which the encapsulation takes place must be chosen so that its characteristics relate suitably to those of the other materials present during encapsulation as well as those of the resin into which the capsules are to be dispersed. Thus the relative viscosities, solubilities and surface tension properties of the encapsulation medium and the fill material are important factors in forming an adequate suspension of the fill material in the encapsulation medium with droplets of the desired size. The size of the droplet of fill material will determine the ultimate size of the microcapsule. It appears, furthermore, that the partition coefficient of the shell wall components between the encapsulation medium and the fill material are important to the formation of functionally impermeable shell walls, i.e. which effectively isolate the liquid fill under conditions of storage. Finally, the encapsulation medium must be compatible with the cationically polymerizable resin to be catalyzed since the microcapsules are generally introduced into it as a concentrate of capsules in the encapsulating medium.

The aromatic polyisocyanate encapsulation media take part in the encapsulation reaction itself and are subsequently reactive with one or more components of the one-part curable systems under curing conditions. Hence, they are often referred to herein as reactive media. The ester encapsulation media do not take part in the encapsulation and they do not react subsequently, e.g. during curing of any cationically curable resin system into which the capsule-medium slurry is mixed. Hence, they are often referred to herein as non-reactive media. Of course, neither type of medium is reactive in a cationically curable resin system under conditions of storage (while the microcapsules remain intact).

Representative of the aromatic polyisocyanates which are suitable for use in the present invention are m-phenylene diisocyanate, mixtures of toluene-2,4-diisocyanate and toluene-2,6-diisocyanate, diphenyl-3,3'-dimethyl-4,4'-diisocyanate, diphenyl-3,3'-dimethoxy-4,4'-diisocyanate, diphenylmethane-4,4'-diisocyanate, diphenylmethane-4,4'-dimethyl-3,3'-diisocyanate and 1,5-naphthalene diisocyanate. The so-called polymeric aromatic polyisocyanates, such as those obtained by phosgenation of polyamines and by condensing formaldehyde with aromatic amines, can also be used. The commercially available products of these types are often mixtures of materials containing minor proportions of molecules having equivalent weights and functionalities outside the limits set hereinabove and which might, in pure form, even be solids at ordinary temperatures. However, such products are referred to herein (as is customary) in terms of averages of equivalent weight and functionality and are suitable for use in the present invention. Particularly useful polyphenyl polyisocyanates having an average of from about 2 to 2.8 isocyanate groups per molecule such as those sold commercially under the trade designations "Mondur" MR and MRS (available from the Mobay Company) and "PAPI 901" (available from the Upjohn Company).

The non-reactive (ester) encapsulation media are preferably the phthalate and trimellitate esters of alkyl or arylalkyl alcohols having from 1 to 20 carbon atoms, for example dimethyl phthalate, diethyl phthalate, dibutyl phthalate, dioctyl phthalate, butylbenzyl phthalate and tri-($\alpha$-ethylhexyl)trimellitate. Butylbenzyl phthalate and tri-($\alpha$-ethylhexyl)trimellitate are the presently preferred non-reactive encapsulation media.

Exemplary of the cycloaliphatic polyepoxides which are suitable as shell wall components are difunctional compounds such as vinylcyclohexenedioxide, 3,4-epoxycyclohexylmethyl, 3,4-epoxycyclohexanecarboxylate and bis(3,4-epoxy-6-methylcyclohexylmethyl) adipate. These are available from the Union Carbide and Carbon Corp. under the trade designations "ERL 4206", "ERL 4221" and "ERL 4289", respectively.

The preferred shell wall-forming ingredients are glycerol, "ERL 4221" and "Mondur MRS".

By the proper choice of constituents (particularly the encapsulation medium) and stirring conditions, several size ranges of droplets of the glycerol catalyst complex can be obtained (varying from about 0.1 micron to 400 microns). Thus, droplets of catalyst complex in the 50–400 micron range can be obtained using a variety of stirring conditions when the encapsulation medium is a phthalate ester, while faster stirring provides smaller droplets in the range of 50–100 microns and slower stirring yields larger droplets in the range of 100–400 microns. The size of the droplets of catalyst in the encapsulation medium is also affected by the temperature of the system. The lower the temperature the smaller are the droplets for a given shear system. This temperature effect can, for example, be achieved with a non-reactive medium (such as tri($\alpha$-ethylhexyl)trimellitate or butylbenzyl phthalate). Thus, droplet sizes of 1–10 microns can be obtained with high speed stirring and cooling to 0° to 10° C. while large droplets (in the 150–400 micron range) result from low speed stirring and temperatures in the 35°–40° C. range. Addition of shell wall-forming materials then results in capsules approximating the size of the droplets.

When a polyisocyanate is used as the encapsulation medium, rapid stirring of the components will provide droplets of catalyst complex or solution in the range of 0.1–25 microns while slower stirring will yield droplets in the range of 25–50 microns.

Various types of conventional stirring apparatus can be used. Home food blenders as well as laboratory stirrers and blenders can be used depending upon the size of droplets required. The speed required to form droplets of a given size is a function of the type of stirrer blade used, the configuration of the container and the amount of material to be dispersed.

The optimum rate of addition of the shell wall-forming components to the stirred dispersion of the catalyst complex in the encapsulation medium is a function of the encapsulation medium that is being employed. If a non-reactive encapsulation medium is being used the shell wall formation is slower and better quality capsules are obtained if the shell wall components are added at a relatively slow rate, e.g. 30 to 60 minutes for a typical laboratory-size preparation. Complete capsule formation in such a case may require from 10 to 18 hours. If a reactive encapsulation medium (such as a polyisocyanate) is used, a rapid addition of the wall-forming components yields good microcapsules since shell wall formation is also very rapid. Thus, with a reactive encapsulation medium the shell wall-forming components may be added over a time period of about 30–120 seconds or more for a typical laboratory-size batch (e.g. 1 kilogram).

The encapsulation process is generally carried out at temperatures ranging from about 0° to 40° C. Due to the speed of capsule formation with a reactive encapsulation medium, a considerable amount of heat is generated within a short time. If the temperature of the system is permitted to rise above 40° C., polymerization of the encapsulation medium can result and cooling may be necessary. Preferably the temperature of the system during the microencapsulation procedure should remain below about 30° C.

The capsule concentrate (the capsules in the encapsulation medium) is ready for use as soon as the encapsulation process is completed. Ordinarily and preferably no medium is removed. If a reactive medium has been used, it reacts to become part of the final resin product, and it must be considered in the material balance of the constituents to assure that substantially complete reaction of the reactive species is ultimately achieved. If a non-reactive medium has been used, it serves as a plasticizer in the final resin product. The concentrate generally contains from about 1 to 10 percent by weight of the Lewis acid catalyst.

During the encapsulation process a small proportion of the catalyst complex ordinarily becomes entrained in the encapsulation medium, thereby escaping encapsulation. Removal of this free catalyst is necessary in order to prevent premature curing of the cationically polymerizable resin system to which it is ultimately added. This is accomplished by adding a Lewis base which is strong enough to complex the acid catalyst and prevent curing of the cationically polymerizable resin, but which is not a strong enough base to effect the polymerization of the resin itself. Lewis bases having a $pK_b$ of about 6–11 have been found to be satisfactory. These scavenger materials can be added to either the capsule concentrate or to the curable resin upon preparing the one-part system. The amount of scavenger needed is generally between about 0.1 and 35 mole percent (based upon the number of moles of catalyst present). Preferably about 6–12 mole percent of the scavenger is used with a non-reactive encapsulation medium and about 1–4 mole percent thereof with a reactive medium.

Suitable scavengers include the following: dimethyl formamide, dibutyl formamide, 2,6-lutidine, 2,5-diacetylimidazole, 3-benzoylpyridine, acridine, 1,1'-carbonyldiimidazole, methyl nicotinate, 2,7-dimethylquinoline, 1,2,4-trimethylpiperazine, 2,5-dimethylpyrazine, 4-pyridine carboxaldehyde, 3-acetylpyridine, quinoline, 2,4,6-trimethylpyridine, methyl isonicotinate, acetonitrile and dimethylsulfoxide. The preferred scavengers for the phthalate ester system are 2,6-lutidine, acridine, methyl isonicotinate and 1,1'-carbonyldiimidazole. The preferred scavengers for the isocyanate system are dimethylformamide, methyl isonicotinate, acridine and 1,1'-carbonyldiimidazole.

Substantially complete capsule rupture or dissolution can be achieved by any of several different mechanisms, e.g. by mechanical shear, by heat or by solvents. The size of the microcapsules in any one-part curable resin system of the invention determines to a large degree the appropriate type of method for rupturing the microcapsules. Thus, those systems which contain the larger microcapsules (25–400 microns) can be activated by any of the previously mentioned methods. They are more friable than the smaller capsules and are thus more suitable for activation by mechanical means, being usually ruptured by shearing between two flat surfaces.

A particularly useful class of products prepared utilizing the catalyst of the invention are latent one-part curable epoxy resin systems containing the larger microcapsules. Such systems can be activated at room temperature and gel very quickly at room temperature, usually in from about 0.5 to 5 minutes. If an appropriate filler such as sand or glass fibers is added, the large microcapsules can be ruptured by simple agitation, e.g. stirring. The longer the agitation is continued, the more complete is the catalyst release and the faster the cure. If the capsules are ruptured, and heat is added to the system subsequently, a good cure results but if heat is added without mechanical capsule rupture, only uneven localized curing may occur.

Any solvent which disrupts the continuity of the shell wall will activate the one-part curable systems, e.g. polar solvents like low molecular weight alcohols and acetone.

The 0.1–20 micron size microcapsules formed in the reactive isocyanate encapsulation media are the most suitable for thermal activation because of the many overlapping centers of polymerization which are present. Microcapsules in the 1–5 micron range are most desirable when the system is to be thermally activated.

The cationically polymerizable monomers (this term includes prepolymers, resins, etc.) which can be used in the one-part curable systems are exemplified by liquid acetals, aziridines, epoxides, ethylenically unsaturated hydrocarbons, N-vinyl compounds, vinyl ethers and, if desired, mixtures thereof. These will often be referred to herein for convenience as monomers. The monomers preferred for use in this invention are the epoxides, although the other cationically polymerizable monomers are useful and can be used as additives to the epoxy systems. The most suitable epoxy materials are resins having an epoxide equivalent number of 2.0 or greater. Included are bisphenol A diglycidyl ether, bisphenol F diglycidyl ether, aliphatic epoxides, cycloaliphatic epoxides, epoxy novolak and heterocyclic-type epoxy resins. These should be substantially free of hydroxyl groups if they are to be used with a capsule concentrate containing a polyisocyanate resin, since the isocyanate groups will react with hydroxyl groups to form urethanes. In some instances a small amount of hydroxyl functionality may be useful since the reaction of the isocyanate group with the hydroxyl group will cause an increase in viscosity and this mechanism can be used as a means by which the viscosity of the final one-part systems may be regulated.

The one-part curable systems which incorporate the concentrates of the present invention appropriately contain I. 1–40 parts (by weight) of the capsule concentrate (including the encapsulation medium); II. 60–99 parts of the cationically curable monomers and III. a Lewis base scavenger having a $pK_b$ of about 6–11, the sum of I and II being 100 parts, and there being about 0.1 to 35 mole percent of III, based on the moles of the Lewis acid in the capsules. The specific amounts of these constituents are carefully balanced in any particular one-part system. Thus, the effective amount of catalyst present is reduced by the amount of the free scavenger present. Also, when the microcapsules are added to a suitable resin (such as an epoxy resin), strict attention must be paid to the amount of hydroxyl functionality present in the resin (particularly when a polyisocyanate encapsulation medium is used to prepare the capsules therein) since the hydroxyl groups could react with free isocyanate groups to form urethane linkages and cause unwanted viscosity increases in the system. Pure bisphenol A and bisphenol F diglycidyl ethers are relatively free of hydroxyl functionality.

Various additives, including fillers, plasticizers and reactive diluents can be used in the one-part, curable systems to modify their properties and render them more suitable for particular end uses. Fillers and plasticizers can ordinarily be added to systems in which the microcapsules are prepared using a reactive encapsulation medium, but reactive diluents must be added with care. Any material which does not dissolve the shell wall may ordinarily be added to the one-part systems based on the microcapsules prepared in the phthalate esters. Suitable fillers may be powdered, granular, particulate or fibrous and include clay, talc, glass beads or bubbles, glass fibers, mineral powders, mineral particles, metal powders, titanium dioxide, silicon carbide, carbon black, mica, silica, sand, mineral fibers and the like. They may be added in amounts ranging from 1 to 95 percent. The phthalate esters used as non-reactive encapsulation media are examples of plasticizers.

The addition of carbon blacks to the room temperature curable systems prepared using 50–150 micron size microcapsules results in several improvements. Thus, thixotropic carbon blacks prevent capsule settling and, additionally, certain carbon blacks (those with a pH greater than 7) enhance the stability of these systems. Useful carbon blacks include those marketed under the trade designations "Regal 99R", "Regal 330R", "Regal 660R", "Vulcan XC-72R" and "Elfex 8" by the Cabot Corporation and "Raven 1020", "Raven 1170" and "Raven 2000" by the Cities Service Columbian Division. "Vulcan XC-72R" carbon black is preferred in view of its ability to impart thixotropy to the one-part curable systems and to enhance their stability. Thus, such systems (ordinarily containing about 1–5 percent of the carbon black) have excellent stability (as indicated by stability of viscosity) and lack of capsule settling after aging 30 days at about 50° C. The carbon black appears to work in conjunction with the Lewis base stabilizers to achieve these results. Carbon black alone does not appear to be a suitable stabilizer. The enhanced stability enables more reactive epoxy resins, e.g. cycloaliphatic epoxy resins, to be formulated into these systems.

The reactive diluents, referred to previously, are added, for example, to obtain faster cure times and to modify the properties of the cured polymer. The reactivity of the diluent also often governs the gel time and effects the latency of the sample. They may include hydroxyl-terminated tackifiers, long-chain polyols, polyesters, polyurethanes, anhydrides, polyisocyanates (including aromatic, cycloaliphatic and aliphatic polyisocyanates), phenylglycidyl ether, decylglycidyl ether, the glycidyl ester of a tertiary $C_9$–$C_{11}$ carboxylic acid (available from the Shell Chemical Corp. under the trade designation "Cardura E Ester"), the butyl ester of epoxidized linseed oil (available from Swift Chemicals under the trade designation "Epoxol 8-2B"), beta or gamma-butyrolactone, styrene, d-limonene, dioxane, trioxane and the like. The reactive diluents may be added in amounts of 1–50 percent based upon the total weight of the system. If styrene is used as a reactive diluent in these compositions, gel times of 5–10 seconds at 100° C. are obtained, and the shelf life of the sample is less than three months. Such a formulation containing "Cardura E Ester" as the reactive diluent has a gel time of about one minute at 100° C. and shelf life of greater than six months. The amount of isocyanate resin (e.g. "Mondur MRS") has an effect on the gel time and shelf life of these formulations (the smaller the amount of "Mondur MRS" present, the shorter is the shelf life and the faster the gel time).

In order to promote reactivity of the isocyanate resin into the polymer in the heat-curable, one-part epoxy compositions in which the microcapsules have been prepared in a reactive polyisocyanate medium, urethane catalysts may be added to the system. Examples of urethane catalysts are stannous octoate, diacetoxydibutyltin, dibutyltindilaurate, lead naphthanate and phenylmercury oleate. Since there is no unencapsulated hydroxyl functionality present in such systems, they exhibit good shelf stability even with urethane catalysts present. The urethane catalyst can be present to the extent of about 0.05 to 0.5 percent based on the total weight of the system.

The latent, one-part epoxy formulations made utilizing catalysts of the present invention are useful in many applications where epoxy resins are currently being employed. In particular, they are useful as adhesives and coatings. They cure rapidly either upon activation at room temperature by shear or upon the application of heat, no solvents are emitted, the polymerization catalyst is already distributed throughout the resin (there is no need for costly and complicated two-part meter mix equipment). Finally, these one-part epoxy systems have excellent shelf stability at room temperature. The following are some specific preferred types of one-part systems.

(1) One-part heat curable compositions of I. 5–40 parts of a latent catalyst concentrate comprising a slurry of 1–5 micron microcapsules in an aromatic polyisocyanate medium, II. 60–95 parts of an epoxy resin and III. a Lewis base scavenger having a $pK_b$ from about 6–11, the sum of I and II being 100 parts and there being 0.1 to 35 mole percent of III based on the moles of Lewis acid in the microcapsules with one or more reactive diluents being optionally included. Hard, bubble-free castings having high tensile strengths and low percentage elongation values can be prepared from them.

(2) One-part heat curable compositions of I. 10–30 parts of catalyst concentrate, II. 70–90 parts of a cationically curable monomer system consisting of 40–80 parts of bisphenol A diglycidyl ether, 5–30 parts of a polyisocyanate reactive diluent and 5–30 parts of a second reactive diluent and III. the scavenger, the sum of I and II being 100 parts. The preferred capsule concentrate uses 20 percent BF$_3$-glycerol as the microcapsule fill material, has an overall BF$_3$ concentration of 4 weight percent and contains 2.0-2.5 mole percent of dimethylformamide, based on the moles of BF$_3$ present.

(3) One-part, room temperature curable epoxy compositions containing I. 10-20 parts of microcapsule concentrate (microcapsules in the 25-50 micron range prepared in isocyanate resin with slow stirring), II. 80-90 parts of a hydroxy-free epoxy resin, e.g. "DER 332" and III. 6-12 mole percent (based on the moles of catalyst) of a catalyst scavenger, preferably 2,6-lutidine. The microcapsules in these systems are capable of being mechanically ruptured, although not as easily as the microcapsules prepared in the phthalate esters. The propensity of pure bisphenol A diglycidyl ether to crystalline can be reduced or obviated by the addition of a reactive diluent or plasticizer (generally in the amount of 1-30 percent).

(4) One-part, room temperature curable systems suitable for use in structural foams. A bisphenol A-type epoxy resin activated with a capsule concentrate of 75-100 micron (or higher) microcapsules prepared in butylbenzylphthalate and stabilized with 2,6-lutidine is filled with 50-80 percent (based on the total weight of the composition) of fibrous and particulate fillers. A foam is produced by blowing agents (e.g. low-boiling hydrocarbons and/or freons). The system is activated by vigorous stirring over a 30-45 second period, thereby fracturing the microcapsules and dispersing the liquid fills throughout the matrix. Gellation takes place in approximately 1-3 minutes.

(5) One-part, room temperature curable systems suitable for use as nut and bolt adhesives. An epoxy novolak resin activated with a concentrate of the large microcapsules as described above (75-100 microns or larger) is filled with a fibrous filler and a small particulate filler, 1-15 microns in size. By applying this adhesive formulation directly to the threads of a bolt and screwing a nut down onto it, the capsules are ruptured and the adhesive cures. The nut is then securely affixed to the bolt. This prevents subsequent loosening of the nut, e.g. due to vibration, etc. Activation of the system is caused by mechanical shear exerted on the microcapsules by the screwing action of the nut. The fillers of choice for these systems are calcium silicate or mineral fiber as the fibrous portion and 4X mica as the particulate filler. The fibrous material is generally present in a 1:3 ratio compared to the mica and the ratio of filler to resin is in the range of 2:5.

The following non-limiting examples will further illustrate the practice of the invention. Unless otherwise indicated, all parts, proportions and percentages (in the examples and throughout the specification and claims) are by weight, and all viscosities are measured using a Brookfield viscometer.

The gel times reported in the examples are run at room temperature except when otherwise indicated. They are determined by placing a drop of the one-part resin system between two glass microscope slides at room temperature and applying a shear force for five seconds to rupture the capsules, then measuring the amount of time required for the bond to set. The shear is applied by manually pressing the slides together and sliding them across each other. Where the gel time test is run at a specific higher temperature (e.g. 150° C.) a drop of the one-part system is placed on a glass cover slip which is being heated to the appropriate temperature by a Kofler Heizbank gradient temperature heating bar. The time required for the droplet to gel completely is recorded. Also, unless otherwise indicated, the gel times are determined on freshly prepared (not aged) samples.

Certain products utilized frequently in the examples are referred to therein for convenience by short descriptive phrases identified as follows.

Polyisocyanate I. A polymethylenepolyphenylisocyanate having a molecular weight of about 380 and an average isocyanate equivalent weight of 133 (thus containing about 2.6 isocyanate groups per molecule) available from the Mobay Company under the trade designation "Mondur MRS".

Polyisocyanate II. A polyphenyl polyisocyanate having an average of from about 2 to 2.8 isocyanate groups per molecule, available from the Upjohn Company under the trade designation "PAPI 901".

Polyisocyanate III. A polymethylenepolyphenylisocyanate having an average functionality of 2.4 isocyanate groups per molecule and an average isocyanate equivalent weight of 132, available from the Mobay Company under the trade designation of "M-432" or alternatively "Mondur MRS-10".

Polyisocyanate IV. A modified 4,4'-diphenylmethanediisocyanate having an average isocyanate functionality of 2.0 and an average isocyanate equivalent weight of 183, available commercially from the Mobay Company under the trade designation "M-323" or alternatively "Mondur PF".

Polyisocyanate V. A polyfunctional aliphatic isocyanate having an average isocyanate equivalent weight of 195, available from the Mobay Company under the trade designation "Desmodur N-100".

Cycloaliphatic polyepoxide I. 3,4-Epoxycyclohexylmethyl 3,4-epoxycyclohexanecarboxylate having the formula

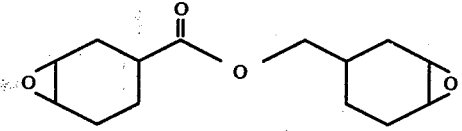

available from the Union Carbide and Carbon Corporation under the trade designation "ERL 4221".

Cycloaliphatic polyepoxide II. Bis(3,4-epoxy-6-methylcyclohexylmethyl) adipate having the formula

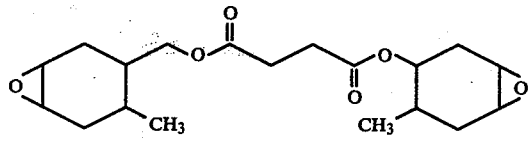

available from the Union Carbide and Carbon Corporation under the trade designation "ERL 4289".

Cycloaliphatic polyepoxide III. A cycloaliphatic-diepoxide having the formula

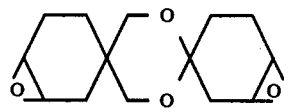

available commercially from the Union Carbide and Carbon Corporation under the trade designation "ERL 4234".

Epoxy resin I. A bisphenol A-based epoxy resin having an epoxy equivalent weight (EEW) of 182–190, available commercially from the Dow Chemical Company under the trade designation "DER 331".

Epoxy resin II. Bisphenol A diglycidyl ether, available commercially from the Dow Chemical Company under the trade designation "DER 332".

Epoxy resin III. An epoxy novolak resin having an epoxy equivalent weight of 172–179, available commercially from the Dow Chemical Company under the trade designation "DEN 431".

Epoxy resin IV. Bisphenol A diglycidyl ether, available commercially from the Celanese Coatings and Specialties Company under the trade designation "Epi-Rez 508".

Epoxy resin V. A hydantoin-based diepoxide of the formula

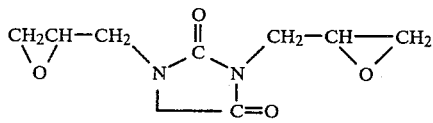

which is available commercially from Ciba-Geigy under the trade designation "XB-2793".

Epoxy resin VI. Bisphenol F-diglycidyl ether, available commercially from the Dow Chemical Company under the trade designation "XD-7818".

Epoxy resin VII. Epoxidized linoleic acid dimer available commercially from the Shell Chemical Corporation under the trade designation "EPON-871".

Reactive diluent I. The glycidyl ester of a tertiary $C_9$-$C_{11}$ carboxylic acid which is available commercially from the Shell Chemical Corporation under the trade designation "Cardura E Ester".

Reactive diluent II. The butyl ester of epoxidized linseed oil, available commercially from Swift Chemicals under the trade designation "Epoxol 8-2B".

Reactive diluent III. "Nadic" methyl anhydride having the formula

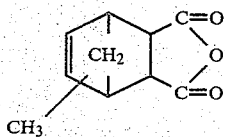

PREPARATION OF THE LATENT CATALYSTS (Examples 1-8)

EXAMPLE 1

In non-reactive medium—capsule size 75–150μ.

One part of boron trifluoride gas is bubbled directly into three parts of glycerol over a 30 minute period with cooling from an ice bath to keep the temperature from exceeding 70° C. Six parts of the resulting 25 percent boron trifluoride-glycerol complex is added to 18 parts of butylbenzyl phthalate with stirring. The stirring apparatus is a Premier Dispersator unit type DD with a 2½ inch diameter (approximately 6.4 cm.) Waring Blendor blade rotating at 1000 rpm. Droplets in the 75–150μ (micron) range form. A solution of two parts of cycloaliphatic polyepoxide I, one part of polyisocyanate I and one part of butylbenzyl phthalate is added dropwise over a period of 45 minutes to the stirred dispersion at room temperature. After five hours of stirring, an additional two parts of polyisocyanate I are added and the mixture is stirred for an additional 16 hours. The resulting product is a concentrate of 75–150μ microcapsules in butylbenzyl phthalate which contains 5 percent by weight of $BF_3$.

EXAMPLE 2

In non-reactive medium—capsule size 100–300μ.

100–300μ microcapsules are prepared utilizing the procedure of Example 1 except pre-warming to 40° C. the butylbenzyl phthalate and the 25 percent $BF_3$-glycerol complex dispersion before adding the solution containing the polyepoxide, the polyisocyanate and the butylbenzyl phthalate. The resulting product contains 5 percent by weight of $BF_3$.

EXAMPLE 3

In non-reactive medium—with various Lewis acids.

Fill complexes as indicated in Table I are prepared by adding the Lewis acids (either neat or in water solution) to the glycerol. The encapsulation is carried out utilizing the procedure of Example 1.

TABLE I

| Lot | Catalyst | Complexing Agent | % Catalyst in the Complex (Calculated) | % Catalyst in Capsule Concentrate |
|---|---|---|---|---|
| A | $SbF_5$ | Glycerol | 25 | 5 |
| B | $PF_5$ | Glycerol | 21 | 4.2 |
| C | $SnCl_4$ | Glycerol | 25 | 5 |
| D | $SbCl_5$ | Glycerol | 25 | 5 |
| E | $HBF_4$ | 31% Water-glycerol | 25 | 5 |
| F | $HPF_6$ | 17% Water-glycerol | 25 | 5 |
| G | $HSbF_6$ | 7% Water-glycerol | 15.5 | 3.1 |
| H | $SbF_5$ | Glycerol | 50 | 10 |

EXAMPLE 4

In non-reactive medium—with various shell wall compositions.

The procedure, materials and ratios of Example 1 are used to prepare concentrates of microcapsules in butylbenzyl phthalate, except that the shell wall-forming components are varied as shown in the following table.

TABLE II

| Lot | Polyisocyanate | Cycloaliphatic polyepoxide |
|---|---|---|
| A | No. II | No. I |
| B | No. III | No. I |
| C | No. IV | No. I |
| D | Toluene diisocyanate | No. I |
| E | No. I | No. II |
| F | No. I | Vinylcyclohexene-dioxide |

EXAMPLE 5

In reactive medium—capsule size 1–5μ.

Polyisocyanate I (735 parts) is placed in a stainless steel beaker, cooled to 7°–10° C. in an ice bath and 20 percent $BF_3$-glycerol complex (210 parts) is dispersed therein using the stirring unit of Example 1 rotating at 4000 rpm. The resulting droplet size range is 1–5μ. A 50:50 solution of polyisocyanate I and cycloaliphatic polyepoxide I (105 parts) is added over a two minute period while maintaining the agitation and cooling (to minimize the temperature rise resulting from the exotherm). The mixture is then stirred less vigorously (2000 rpm) until the temperature drops to 17° C., dimethylformamide (1.05 parts) is added with continual stirring and the mixture is degassed. The resulting capsule concentrate contains 4 percent $BF_3$ catalyst and 2.4 mole percent of dimethylformamide scavenger (based on moles of $BF_3$).

EXAMPLE 6

In reactive medium—capsule size 25–50μ.

Using the procedure of Example 5, except for less vigorous stirring (1000 rpm) a concentrate of capsules in the range of 25–50μ is obtained. The resulting capsule concentrate contains 4 percent $BF_3$ catalyst and 2.4 mole percent of dimethylformamide scavenger (based on the moles of $BF_3$).

EXAMPLE 7

In reactive medium—with a different Lewis acid.

Capsules are prepared using the procedure and amounts of Example 5, except using a 20 percent antimony pentafluoride-glycerol complex in place of a boron trifluoride-glycerol complex and using 2,6-lutidine (1.54 parts) in place of the dimethylformamide. The resulting capsule concentrate contains 4 percent $SbF_5$ catalyst and 7.4 mole percent of 2,6-lutidine (based on the moles of catalyst).

ONE-PART, ROOM TEMPERATURE-CURABLE SYSTEMS CONTAINING THE LATENT CATALYSTS (Examples 8–13)

EXAMPLE 8

Containing various latent catalysts.

TABLE III

| Lot | Shell Wall Components (cycloaliphatic polyepoxide/polyisocyanate) | Catalyst | Viscosity of Aged Sample (cps) | Age of Sample (days) |
|---|---|---|---|---|
| A | I/I | 25% $SbF_5$-glycerol | 7,000 | 13 |
| B | I/I | 25% $SnCl_4$-glycerol | 6,400 | 12 |
| C | I/I | 25% $SbCl_5$-glycerol | 8,100 | 12 |
| D | I/I | 25% $HPF_6$-glycerol | 7,300 | 12 |
| E | I/I | 15.5% $HSbF_6$-glycerol | 5,700 | 7 |
| F | I/II | 25% $BF_3$-glycerol | 12,400 | 28 |
| G | I/III | 25% $BF_3$-glycerol | 14,500 | 26 |
| H | I/IV | 25% $BF_3$-glycerol | 95,000 | 26 |
| I | I/I | 25% $BF_3$-glycerol | 4,000 | 3 |
| J | Vinycyclohexene-dioxide/I | 25% $BF_3$-glycerol | 20,500 | 148 |

By mixing 10 parts of the capsule concentrate of Example 6 and 90 parts of 5 percent dioctyl phthalate-epoxy resin II together, a latent one-part epoxy system is prepared which has an initial viscosity of 4,250 cps and a viscosity of 9,700 cps after 13 days (Lot K).

EXAMPLE 9

Containing various scavengers.

The systems described in Table IV are prepared by mixing the scavenger with 85 parts of 50:50 epoxy resins I and II and 15 parts of the $BF_3$-glycerol capsule concentrate of Example 1.

The storage stability of these systems is shown in the table by the relatively minor changes in viscosity over 55 days storage at room temperature (e.g. 20°–25° C.). Their reactivity is shown by the short time to gel after activation.

TABLE IV

| Lot | Scavenger | Amount of Scavenger (parts) | Initial Viscosity (cps) | Viscosity after 55 days (cps) | Δ Viscosity (cps) | Gel Time (min) |
|---|---|---|---|---|---|---|
| A | 2,6-lutidine | .118 | 5,500 | 8,600 | 3,100 | 2.00 |
| B | 2,5-lutidine | .188 | 5,200 | 9,400 | 4,200 | 2.00 |
| C | 2,4,6-trimethyl-pyridine | .134 | 5,200 | 8,400 | 3,200 | 1.50 |
| D | 4-pyridine-carboxaldehyde | .118 | 4,800 | 8,800 | 4,000 | 1.50 |
| E | methyl isonicotinate | .151 | 3,500 | 5,300 | 1,800 | 2.00 |
| F | 3-acetylpyridine | .133 | 5,800 | 9,700 | 3,900 | 1.75 |
| G | quinoline | .142 | 5,400 | 8,800 | 3,400 | 1.50 |
| H | 2,4,6-trimethyl-piperidine | .140 | 5,400 | 8,500 | 3,100 | 1.25 |
| I | 1-benzyl-4-piperidone | .208 | 5,200 | 8,700 | 3,500 | 1.25 |
| J | 1-acetylimidazole | .121 | 5,300 | 8,900 | 3,600 | 2.00 |
| K | 3-benzoylpyridine | .201 | 4,400 | 7,300 | 2,900 | 1.75 |
| L | acridine | .197 | 3,400 | 5,200 | 1,800 | 1.50 |
| M | 1,1'-carbonyldiimidazole | .178 | 2,900 | 4,700 | 1,800 | 1.50 |
| N | methyl nicotinate | .151 | 4,900 | 9,100 | 4,200 | 1.50 |
| O | 2,7-dimethylquinoline | .173 | 4,100 | 6,400 | 2,300 | 6.00 |
| P | 1,2,4-trimethyl-piperazine | .141 | 5,300 | 8,200 | 2,900 | 2.50 |
| Q | 2,5-dimethylpyrazine | .119 | 4,600 | 8,400 | 3,800 | 1.50 |

Using 15 parts of various capsule concentrates from Examples 3 and 4, 85 parts of 50:50 epoxy resins I and II and 7.5 mole percent of 2,6-lutidine (based on the moles of Lewis acid), latent, one-part epoxy formulations are prepared and evaluated for stability. The results are presented in the following table.

EXAMPLE 10

With various proportions of components.

The following systems are prepared by the procedure of Example 9 utilizing the capsule concentrate of Example 1 and 2,6-lutidine as the scavenger in all cases.

TABLE V

| Lot | Formulation | Mole % 2,6-lutidine (based on catalyst) | Initial Viscosity (cps) | Viscosity of Aged Sample (cps) | Age of Sample (days) | Rm. Temp. Gel Time (min) |
| --- | --- | --- | --- | --- | --- | --- |
| A | 85 parts Epoxy Resin II<br>15 parts Capsule Concentrate<br>.06 part 2,6-lutidine | 5.1 | 3,800 | 5,500 | 153 | 3.5 |
| B | 80 parts Epoxy Resin I<br>20 parts Capsule Concentrate<br>.12 part 2,6-lutidine | 7.6 | 11,000 | 13,000 | 43 | 1.5 |
| C | 85 parts 50:50 Epoxy Resins I and II<br>15 parts Capsule Concentrate<br>.09 part 2,6-lutidine | 7.6 | 5,800 | 32,000 | 114 | 2.0 |
| D | 80 parts Epoxy Resin III<br>20 parts Capsule Concentrate<br>.12 part 2,6-lutidine | 7.6 | 35,000 | 75,500 | 34 | 1.0 |

EXAMPLE 11

Adding carbon black.

Carbon black ("Vulcan XC-72R", a product of Godfrey L. Cabot, Inc. of Boston, Mass.) is added in varying amounts to the following formulation:

85.00 parts epoxy resin I
15.00 parts 5% $BF_3$ capsule concentrate (of Example 1)
0.12 part methyl isonicotinate
X parts carbon black It is found that from about 2 to 4 parts of carbon black in this formulation is required to obtain both 30 day storage stability (without gelling) at approximately 50° C. and good curing properties (gel time of the aged sample of about 2 minutes).

One-part curable formulations of the invention containing epoxy resins III and VI (respectively an epoxy novolak and bisphenol F diglycidyl ether) and carbon black ("XC-72R") have excellent stability and retain good curing properties even after extended storage at 50° C. Thus, formulations of the type:

85.00 parts epoxy resin III or VI
15.00 parts 5% $BF_3$ capsule concentrate (of Example 1)
0.12 part methyl isonicotinate
2-5 parts carbon black remain ungelled after storage for 23-28 days at 50° C. but can still be gelled upon activation in 1.5 to 2.5 minutes.

Similar formulations having shorter gel times are prepared by replacing part of the epoxy resin by a cycloaliphatic polyepoxide. Thus, the formulation:

75.00 parts epoxy resin I
10.00 parts cycloaliphatic polyepoxide III
15.00 parts 5% $BF_3$ capsule concentrate (of Example 1)
0.12 part methylisonicotinate
4.00 parts carbon black ("Vulcan XC-72R")

changes in viscosity only very slowly with storage at 50° C. (6300 cps after 4 days; 7900 cps after 28 days) and retains good curing properties (30 second gel time after 4 days; 45 second gel time after 28 days).

Comparable formulations in which from 5 to 10 parts of the epoxy resin I have been replaced by cycloaliphatic polyepoxide I are less stable but have even shorter gel times for the first several days.

EXAMPLE 12

A structural foam—cured by shear.

A one-part, room temperature activateable system of the invention is prepared according to the following formulation:

30.00 parts epoxy resin I
0.12 part 2,6-lutidine (28 mole % of the $BF_3$)
0.10 parts silicone surfactant (available from Union Carbide Corp. under the trade designation "L-5340")
10.00 parts 1/16" milled glass fiber
1.00 part pentane
4.00 parts high aspect ratio mica 200
5.30 parts 5% $BF_3$ capsule concentrate (of Example 1)
50.00 parts 100–400μ sand The system is activated via high speed stirring with a propeller-type blade at room temperature for 30 seconds. The resin foams and sets up within 2-3 minutes. The density of the uncured resin is 1.36 gms/cc, and that of the cured material is 1.00-1.15 gms/cc.

EXAMPLE 13

Nut and bolt fastener adhesives—cured by shear.

Formulation 1

40.00 parts epoxy resin II
10.00 parts 5% $BF_3$ capsule concentrate (of Example 1)
0.12 part 2,6-lutidine (15 mole % of the $BF_3$)
15.00 parts 4X mica
5.00 parts mineral fiber (a primarily silicon oxide-calcium oxide fiber, a product of the United States Pipe and Foundry Co., Coal, Iron and Chemicals Div.)

Formulation 2

40.00 parts epoxy resin II
10.00 parts 5% $BF_3$ capsule concentrate (of Example 1)
0.12 part 2,6-lutidine (15 mole % of the $BF_3$)
15.00 parts 4X mica
5.00 parts Wollastonite F1 (calcium metasilicate filler, a product of the Interpace Corp.)

The adhesives are applied to $\frac{3}{8}'' \times \frac{1}{2}''$ SAE hex head bolts and nuts to match by placing enough material on each bolt to fill about $\frac{1}{4}''$ of the threaded portion. Activation is accomplished by screwing the nuts onto the bolts. If a similar nut is seated on a bolt without any adhesive present with 20 ft-lbs of torque, the amount of torque required to unseat the nut (break-loose torque—B.L.T.) is 17 ft-lbs, and the maximum torque required for the first 360° turn is 0 ft-lbs (prevailing-out torque—P.O.T.). Four nut and bolt assemblies using Formulation 1 have an average B.L.T. of 23 ft-lbs and P.O.T. of 17 ft-lbs in a similar test. If the nut is not seated on the bolt, the average P.O.T. is 16 ft-lbs for Formulation 1 and 11 ft-lbs for Formulation 2.

ONE-PART, HEAT-CURABLE SYSTEMS CONTAINING THE LATENT CATALYSTS (Examples 14–18)

EXAMPLE 14

Containing various latent catalysts.

One-part, heat-curable systems are prepared using the 4 percent $BF_3$ capsule concentrate from Example 5 and epoxy resin V, a hydatoin-based epoxy resin. Data on three such systems, including stability prior to activation and speed of reaction upon activation (gel time) are as follows:

TABLE VI

| Lot | Resin Formulation | Initial Viscosity (cps) | Viscosity of Aged Sample (cps) | Age of Sample (days) | Gel Time (sec/°C.) |
|---|---|---|---|---|---|
| A | 90 parts Epoxy Resin V<br>10 parts 4% $BF_3$ Capsule Concentrate | 2,250 | 10,600 | 17 | 195/150 |
| B | 80 parts Epoxy Resin V<br>10 parts Polyisocyanate I<br>10 parts 4% $BF_3$ Capsule Concentrate | 2,000 | 31,000 | 17 | 120/150 |
| C | 80 parts Epoxy Resin V<br>5 parts Polyisocyanate I<br>15 parts 4% $BF_3$ Capsule Concentrate | 2,350 | 40,500 | 17 | 95/150 |

Using 4 percent $SbF_5$ capsule concentrate from Example 7, one-part, curable epoxies are prepared and tested for stability prior to activation and for speed of reaction upon activation with the following results:

TABLE VII

| Lot | Formulation | Viscosity at 4 days (cps) | Viscosity of Aged Sample (cps) | Age of Sample (days) | Gel Time (sec/°C.) |
|---|---|---|---|---|---|
| D | 50 parts Epoxy Resin II<br>10 parts Reactive Diluent II<br>25 parts Polyisocyanate I<br>15 parts 4% $SbF_5$ Capsule Concentrate | 6,350 | 53,500 | 119 | 73/150 |
| E | 60 parts Epoxy Resin II<br>20 parts Reactive Diluent II<br>10 parts Polyisocyanate I<br>10 parts 4% $SbF_5$ Capsule Concentrate | 7,900 | 77,000 | 119 | 46/150 |

EXAMPLE 15

With various reactive diluents.

Latent, one-part, heat-curable epoxy systems are formulated by mixing 50 parts of epoxy resin II, 15 parts of the 4 percent $BF_3$ capsule concentrate of Example 5, 25 parts of polyisocyanate I and 10 parts of a reactive diluent. Table VIII lists these reactive diluents, gel time and aging study data.

TABLE VIII

| Lot | Reactive | Initial Viscosity (cps) | Viscosity of Aged Sample (cps) | Age of Sample (days) | Gel Time of Aged Samples (sec/°C.) |
|---|---|---|---|---|---|
| A | No. I | 1,000 | 6,800 | 216 | 31/150 |
| B | Phenyl glycidyl ether | 1,500 | 3,700 | 200 | 30/150 |
| C | Styrene | 250 | 25,000 | 65 | 5/150 |
| D | Styrene | 12 250 | 150,000 | 129 | 7/150 |
| E | D-limonene | 6,100 | 37,500 | 129 | 20/150 |
| F | No. II | 1,700 | 38,500 | 119 | 28/150 |
| G | γ-Butyrolactone | 12 750 | 13,400 | 60 | 3/150 |
| H | γ-Butyrolactone | 750 | 100,000 | 133 | 32/150 |
| I | No. III | 1,750 | 66,500 | 64 | 3/150 |
| J | No. III | 1,750 | >100,000 | 129 | — |
| K | The triglycidyl ether of trimethylol propane | 2,000 | 27,500 | 13 | 30/150 |
| L | The triglycidyl ether of trimethylol propane | 2,000 | >100,000 | 28 | — |

EXAMPLE 16

With various proportions of components and reactive diluents.

The capsule concentrate of Example 5 is used in the formulations of this example. The resulting viscosity and gel time tests (Table IX) show that the more polyisocyanate present in a given system, the less its reactivity and the greater its stability.

TABLE IX

| Lot | Formulation | Age of Sample (days) | Viscosity (cps) | Gel Time of Aged Samples (sec/°C.) |
|---|---|---|---|---|
| A | 50 parts Epoxy Resin IV<br>10 parts Styrene<br>25 parts Polyisocyanate I<br>15 parts Capsule Concentrate | 0<br>21 | 300<br>440 | 10/80<br>140/100 |
| B | 55 parts Epoxy Resin IV<br>10 parts Styrene<br>20 parts Polyisocyanate I<br>15 parts Capsule Concentrate | 0<br>21 | 300<br>975 | 10/80<br>93/100 |
| C | 60 parts Epoxy Resin IV<br>10 parts Styrene<br>15 parts Polyisocyanate I<br>15 parts Capsule Concentrate | 0<br>21 | 350<br>37,500 | 10/80<br>35/100 |
| D | 65 parts Epoxy Resin IV<br>10 parts Styrene<br>10 parts Polyisocyanate I<br>15 parts Capsule Concentrate | 0<br>21 | 450<br>93,500 | 10/80<br>13/100 |

The systems reported in Table X are prepared using the 4 percent $BF_3$ capsule concentrate of Example 5.

TABLE X

| Lot | Formulation | Initial Viscosity (cps) | Viscosity of Aged Sample (cps) | Age of Sample (days) | Gel Time of Aged Samples (sec/°C.) |
|---|---|---|---|---|---|
| E | 57 parts Epoxy Resin IV<br>11 parts Styrene<br>22 parts Polyisocyanate I<br>10 parts 4% BF$_3$ Capsule Concentrate | 200 | 575 | 7 | 10–15/150 |
| F | 50 parts Epoxy Resin II<br>5 parts Reactive Diluent I<br>30 parts Polyisocyanate I<br>15 parts 4% BF$_3$ Capsule Concentrate | 1,000 | 4,500 | 70 | 35/150 |
| G | 60 parts Epoxy Resin II<br>10 parts Reactive Diluent II<br>10 parts Polyisocyanate I<br>20 parts 4% BF$_3$ Capsule Concentrate | 7,900 | 77,000 | 119 | 46/150 |
| H | 60 parts Epoxy Resin II<br>15 parts Reactive Diluent II<br>10 parts Polyisocyanate I<br>15 parts 4% BF$_3$ Capsule Concentrate | 6,330 (4 days) | 50,000 | 26 | 8/150 |
| I | 30 parts Epoxy Resin II<br>5 parts Reactive Diluent I<br>50 parts Polyisocyanate I<br>15 parts 4% BF$_3$ Capsule Concentrate | 1,300 (21 days) | 1,750 | 70 | 65/150 |
| J | 57 parts Epoxy Resin II<br>11 parts Trioxane<br>16 parts Polyisocyanate I<br>16 parts 4% BF$_3$ Capsule Concentrate | 480 | 800 | 1 | 5/80 |
| K | 57 parts Epoxy Resin II<br>11 parts Styrene<br>16 parts Polyisocyanate V<br>16 parts 4% BF$_3$ Capsule Concentrate | 450 | 810 | 3 | 45/150 |
| L | 57 parts Epoxy Resin VII<br>11 parts Styrene<br>16 parts Polyisocyanate I<br>16 parts 4% BF$_3$ Capsule Concentrate | 650 | 2,900 | 0.3 | 8/150 |

EXAMPLE 17

Adding a urethane catalyst.

Urethane catalysts can be added to the heat-curable systems in order to facilitate the reaction of the isocyanate and hydroxyl groups therein. Thus, one part of a tin-containing catalyst for the formation of urethanes (available from the Witco Chemical Company under the trade designation "Fomrez UL-1") is added to a formulation of 50 parts of epoxy resin II, 25 parts of polyisocyanate I, 15 parts of reactive diluent II and 15 parts of the capsule concentrate of Example 5. This system has an initial viscosity of 1,450 cps, a viscosity of 49,500 cps after 42 days and a gel time of 9 seconds at 150° C.

EXAMPLE 18

Castings from compositions containing reactive diluents.

Formulation 1

55 parts epoxy resin II
10 parts styrene
20 parts polyisocyanate I
15 parts 4% BF$_3$ capsule concentrate (of Example 5)

Formulation 2

55 parts epoxy resin II
10 parts reactive diluent I
20 parts polyisocyanate I
15 parts 4% BF$_3$ capsule concentrate (of Example 5)

Castings suitable for use as testing specimens are prepared and cured for 15 minutes at 150° C. The average tensile strength of five samples of formulation 1 is 3,800 psi (266 kg/cm$^2$), and the average elongation at break is 4.7 percent. The average tensile strength of five samples of formulation 2 is 8,516 psi (600 kg/cm$^2$), and the average elongation at break is 7.7 percent.

Useful one-part, curable systems of the invention are also prepared by dispersing the catalyst concentrates of Examples 1–7 (stabilized with suitable scavengers) in cationically polymerizable monomers and/or prepolymers including isobutylene, vinyl carbazole, vinyl isobutyl ether, 2,5-dimethyl-2,4-hexadiene, β-propiolactone, β-caprolactone, glycolide, para-acetaldehyde, dioxane, aziridine and triphenylphosphite.

What is claimed is:

1. A latent catalyst concentrate which comprises a slurry of
   A. rupturable, impermeable microcapsules ranging in size from about 0.1 to 400 microns having
      (1) shell walls of a crosslinked interfacial polyurethane-polyether reaction product of an aromatic polyisocyanate having an equivalent weight of up to about 380 and a functionality of from about 2 to 6, glycerol and a cycloaliphatic polyepoxide having an equivalent weight of from about 70 to 220 and a functionality of from about 2 to 3, and
      (2) liquid fills comprising a Lewis acid-glycerol complex in
   B. a liquid medium selected from aromatic polyisocyanates as defined above and esters of an aromatic carboxylic acid and an alkyl, aralkyl or aryl alcohol, the ester containing up to about 40 carbon atoms.

2. A latent catalyst concentrate according to claim 1 in which the microcapsules are reaction products of
   (a) 5–25 parts of the Lewis acid,
   (b) 5–30 parts of the aromatic polyisocyanate,
   (c) 5–20 parts of the cycloaliphatic polyepoxide and
   (d) 25–75 parts of glycerol, the sum of (a), (b), (c) and (d) in the microcapsules being 100 parts.

3. A latent catalyst concentrate according to claim 1 which additionally contains in the liquid medium thereof from about 0.1 to 35 mole percent, based upon the amount of Lewis acid present in the microcapsule fills, of a Lewis base scavenger which has a $pK_b$ of from about 6 to 11.

4. A latent catalyst concentrate according to claim 1 in which the Lewis acid makes up from about 1 to 10 percent of the weight of the concentrate.

5. A latent catalyst concentrate according to claim 1 which contains from about 1 to 50 parts of A., the microcapsules, and 50 to 99 parts of B., the liquid medium, the sum of A. and B. being 100 parts.

6. A latent catalyst concentrate according to claim 5 which contains from about 10 to 40 parts of A., the microcapsules, and 60 to 90 parts of B., the liquid medium, the sum of A. and B. being 100 parts.

7. A latent catalyst concentrate according to claim 1 in which the microcapsules range in size from about 25 to 400 microns.

8. A latent catalyst concentrate according to claim 1 in which the microcapsules range in size from about 0.1 to 20 microns.

9. A latent catalyst concentrate according to claim 1 in which the microcapsules range in size from about 1 to 5 microns.

10. A latent catalyst concentrate according to claim 1 in which the functionality of the cycloaliphatic polyepoxide is 2.

11. A latent catalyst concentrate according to claim 1 in which the aromatic polyisocyanate is a polyphenyl polyisocyanate having an average functionality of from about 2 to 2.8.

12. A latent catalyst concentrate according to claim 1 in which the aromatic polyisocyanate and the cycloaliphatic polyepoxide are respectively a polymethylenepolyphenylisocyanate having an average molecular weight of about 380 and an average functionality of about 2.6 and 3,4-epoxycyclohexylmethyl 3,4-epoxycyclohexanecarboxylate.

13. A latent catalyst concentrate according to claim 12 in which the microcapsules range in size from about 1 to 5 microns and the concentrate contains about 4 percent by weight of boron trifluoride.

14. Rupturable, impermeable microcapsules ranging in size from about 0.1 to 400 microns having
   (1) shell walls of a crosslinked interfacial polyurethane-polyether reaction product of an aromatic polyisocyanate having an equivalent weight of up to about 380 and a functionality of from about 2 to 6, glycerol and a cycloaliphatic polyepoxide having an equivalent weight of from about 70 to 220 and a functionality of from about 2 to 3, and
   (2) liquid fills comprising a Lewis acid-glycerol complex.

15. Microcapsules according to claim 14 which are reaction products of (a) 5-25 parts of the Lewis acid,
   (b) 5-30 parts of the aromatic polyisocyanate,
   (c) 5-20 parts of the cycloaliphatic polyepoxide and
   (d) 25-75 parts of glycerol,
the sum of (a), (b), (c) and (d) being 100 parts.

16. Microcapsules according to claim 14 which range in size from about 25 to 400 microns.

17. Microcapsules according to claim 14 which range in size from about 0.1 to 20 microns.

18. Microcapsules according to claim 14 which range in size from about 1 to 5 microns.

19. Microcapsules according to claim 14 in which the functionality of the cycloaliphatic polyepoxide is 2.

20. Microcapsules according to claim 14 in which the aromatic polyisocyanate is a polyphenyl polyisocyanate having an average functionality of from about 2 to 2.8.

21. Microcapsules according to claim 14 in which the aromatic polyisocyanate and the cycloaliphatic polyepoxide are respectively a polymethylenepolyphenylisocyanate having an average molecular weight of about 380 and an average functionality of about 2.6 and 3,4-epoxycyclohexylmethyl 3,4-epoxycyclohexanecarboxylate.

22. Microcapsules according to claim 21 in which the microcapsules range in size from about 1 to 5 microns and the concentrate contains about 4 percent by weight of boron trifluoride.

23. A method for the preparation of a latent catalyst concentrate which comprises
   (a) dispersing and maintaining discrete droplets of a complex of a Lewis acid with glycerol in a liquid medium selected from aromatic polyisocyanates having an equivalent weight of up to about 380 and a functionality of from about 2 to 6 and esters of an aromatic carboxylic acid and an alkyl, aralkyl or aryl alcohol, the ester containing up to about 40 carbon atoms, and
   (b) adding to said liquid medium a composition comprising an aromatic polyisocyanate as defined above and a cycloaliphatic polyepoxide having an equivalent weight of from about 70 to 220 and a functionality of from about 2 to 3,
whereby interfacial polycondensation occurs at the droplet surface to form a slurry of rupturable, impermeable microcapsules having shell walls of a crosslinked interfacial polyurethane-polyether reaction product of the aromatic polyisocyanate and the cycloaliphatic polyepoxide and liquid fills comprising the Lewis acid-glycerol complex.

24. A method according to claim 23 wherein the liquid medium is an aromatic isocyanate.

25. A method according to claim 23 wherein the liquid medium is an ester.

26. A method according to claim 25 wherein the liquid medium is a phthalate ester.

27. A method according to claim 25 wherein the liquid medium is a trimellitate ester.

28. A method according to claim 23 wherein the Lewis acid is $BF_3$.

* * * * *

UNITED STATES PATENT AND TRADEMARK OFFICE
CERTIFICATE OF CORRECTION

PATENT NO. : 4,225,460
DATED : September 30, 1980
INVENTOR(S) : Richard G. Newell It is certified that error appears in the above—identified patent and that said Letters Patent is hereby corrected as shown below:

In column 14, Table IV, Lot B, change ".188" to -- .118 --.

In column 18, Table VIII, line 5, change "(cps9" to -- (cps) --.

In column 18, Table VIII, line 9, (D), change "12 250" to -- 250 --.

In column 18, Table VIII, line 12, (G), change "12 750" to -- 750 --.

In column 20, line 42, change "β-caprolactone" to -- ε-caprolactone --.

Signed and Sealed this

Sixth Day of January 1981

[SEAL]

Attest:

SIDNEY A. DIAMOND

Attesting Officer

Commissioner of Patents and Trademarks